US 6,239,547 B1

(12) United States Patent
Uemura et al.

(10) Patent No.: US 6,239,547 B1
(45) Date of Patent: May 29, 2001

(54) ELECTRON-EMITTING SOURCE AND METHOD OF MANUFACTURING THE SAME

(75) Inventors: Sashiro Uemura; Takeshi Nagasako; Junko Yotani; Mitsuaki Morikawa; Yahachi Saito, all of Mie (JP)

(73) Assignee: Ise Electronics Corporation (JP)

( * ) Notice: Subject to any disclaimer, the term of this patent is extended or adjusted under 35 U.S.C. 154(b) by 0 days.

(21) Appl. No.: 09/162,731

(22) Filed: Sep. 28, 1998

(30) Foreign Application Priority Data

| Sep. 30, 1997 | (JP) | 9-266947 |
| Oct. 3, 1997 | (JP) | 9-271625 |
| Jul. 17, 1998 | (JP) | 10-203249 |

(51) Int. Cl.[7] .................................. H01J 29/46
(52) U.S. Cl. ..................... 313/495; 313/309; 313/336; 313/351; 313/497; 313/311
(58) Field of Search .................. 313/309, 336, 313/351, 311, 497, 495

(56) References Cited

U.S. PATENT DOCUMENTS 6,097,138 * 8/2000 Nakamoto ............... 313/309

FOREIGN PATENT DOCUMENTS

| 4405768 | 8/1995 | (DE) . |
| 0838831 | 4/1998 | (EP) . |
| WO 9642101 | 12/1996 | (WO) . |
| WO9811588 | 3/1998 | (WO) . |

OTHER PUBLICATIONS

Heer De W A et al: Electron Field Emitters Based on carbon Nanotube Films: Jan. 1997, Advanced Materials, vol. 9, pp. 87–89.

Heer De W A et al.: "A Carbon Nanotube Field–Emission Electron Source" Nov. 17, 1995, Science, vol. 270, pp. 1179–1180.

Van Tendeloo G. et al.: "Reduced Dimensionally in Different Forms of Carbon" 1988, Carbon, vol. 36, Nr. 5–6 pp. 487–793.

Amelinckx S.: "Conical, helically Wound, Graphite Whiskers: A Limiting Member of the fullernes" Aug. 1, 1992, Journal of Crystal Growth, vol. 121, NR. 4, pp. 543–558.

Heer De W.A. et al.: "Aligned Carbon Nanotube Films: Production and Optical Electronic Properties" May 12, 1995, Science, vol. 268 pp. 848–847.

Chernozatonskii L A et al: "Electron Field Emission From Nanofilament Carbon Films" Feb. 3, 1995, Chemical Physics Letters, vol. 233, Nr. 1, pp. 63–68.

Fishbine F H et al.: Buckytube Cold Field Emitter Array Cathode Experiements 1995, Materials Research Society Symposium Proceedings, vol. 359, pp. 93–98.

* cited by examiner

Primary Examiner—Ashok Patel
(74) Attorney, Agent, or Firm—Blakely Sokoloff Taylor & Zafman

(57) ABSTRACT

An electron-emitting source of this invention includes at least a carbon nanotube formed from a columnar graphite layer. Electron are emitted from the tip of the carbon nanotube.

11 Claims, 10 Drawing Sheets

FIG. 1A
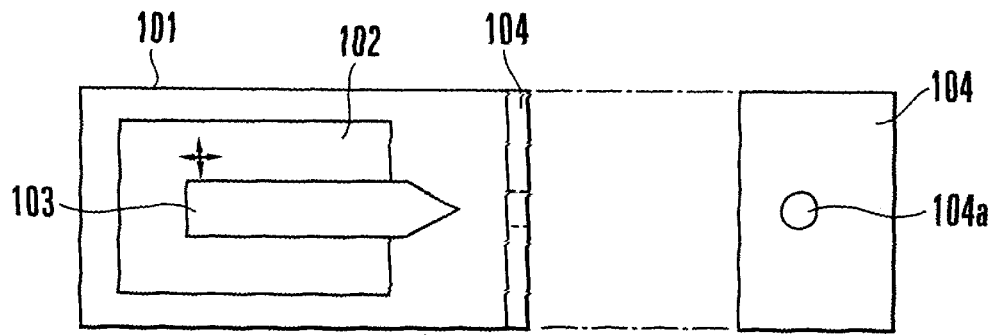
FIG. 1B
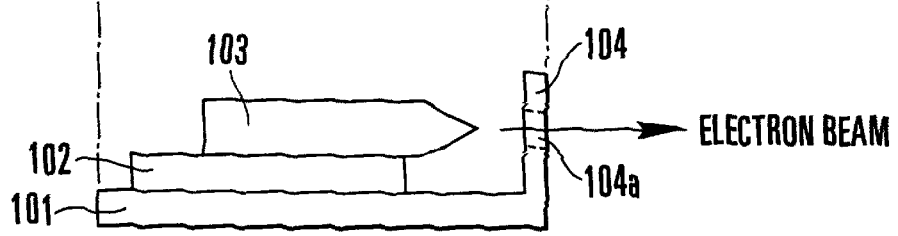
FIG. 1C
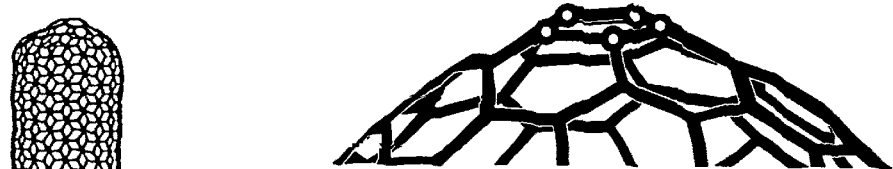
FIG. 1E
FIG. 1D
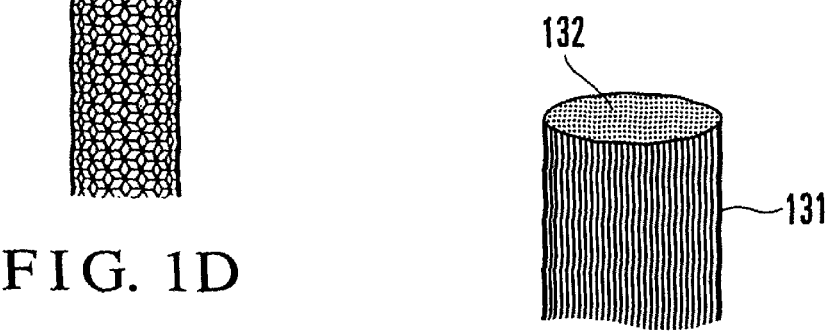
FIG. 1F

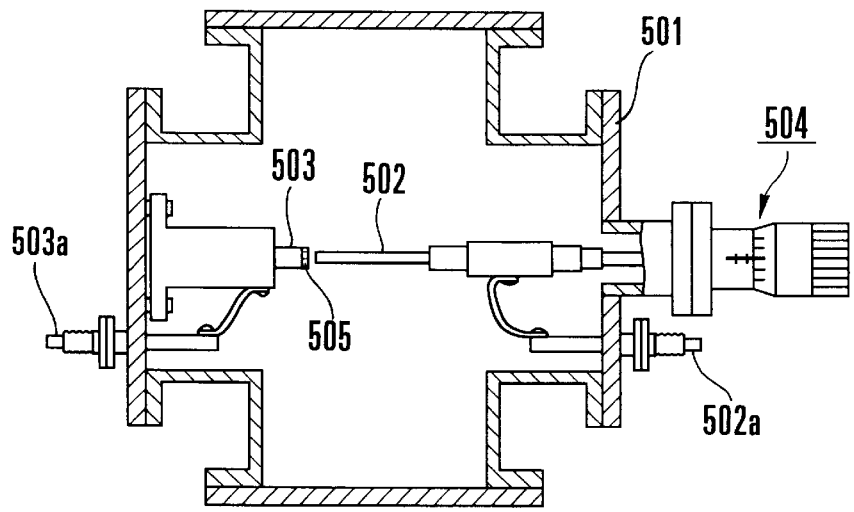
FIG. 5A
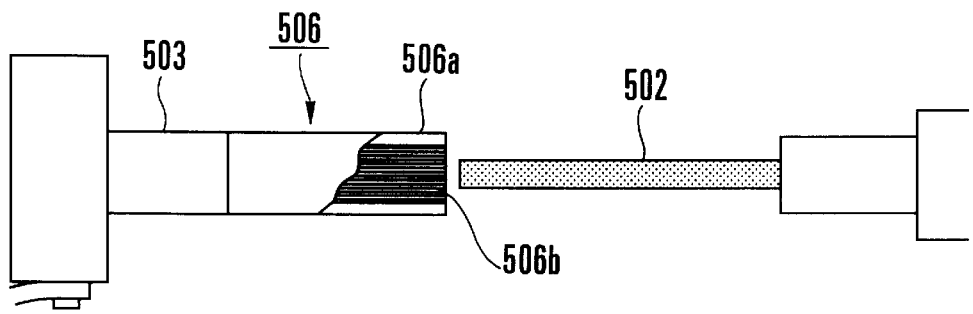
FIG. 5B
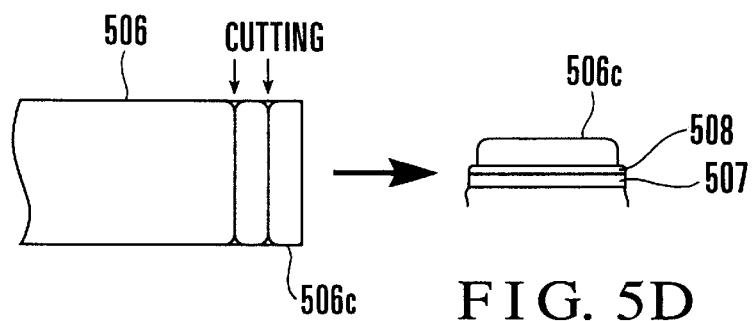
FIG. 5C
FIG. 5D

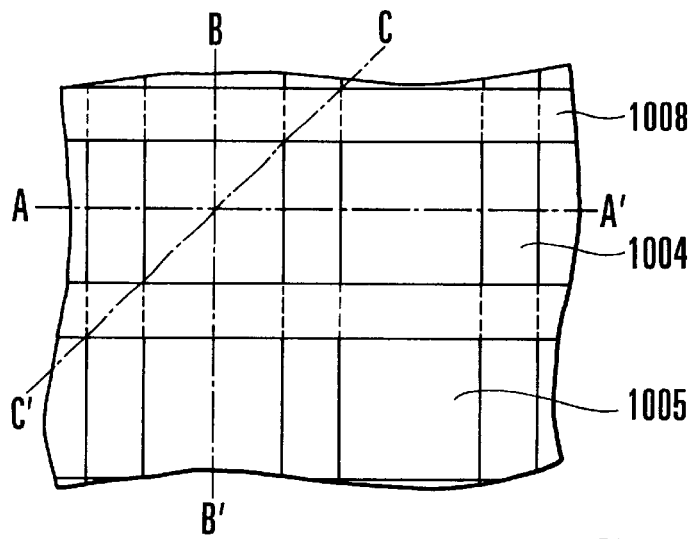
F I G. 11
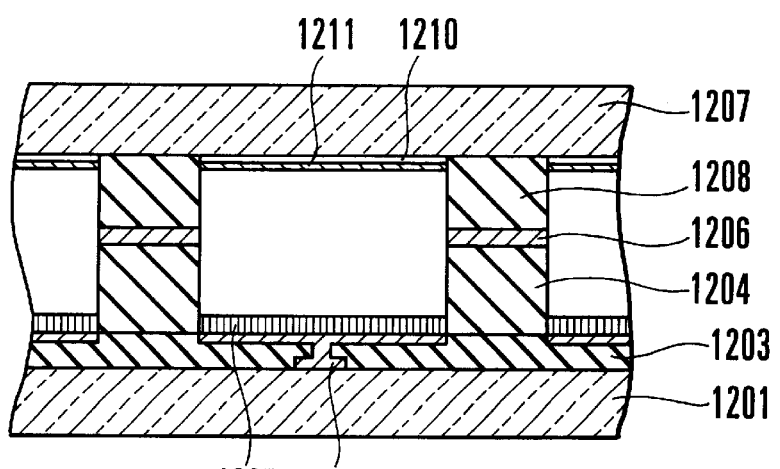
F I G. 12
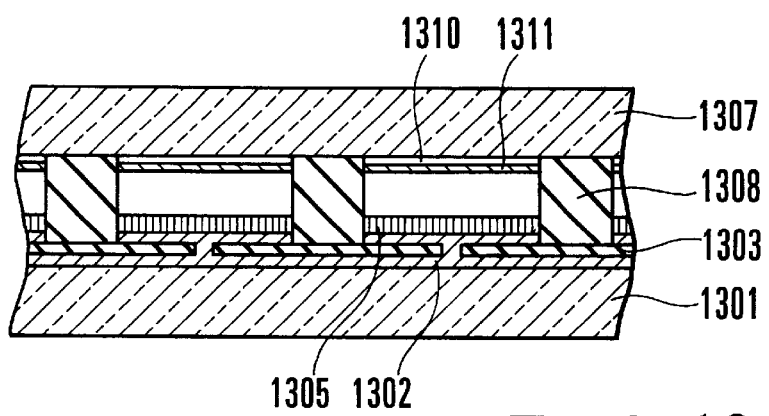
F I G. 13

ELECTRON-EMITTING SOURCE AND METHOD OF MANUFACTURING THE SAME

BACKGROUND OF THE INVENTION

The present invention relates to an electron-emitting source which is arranged in vacuum and emits electrons upon application of the voltage, and a method of manufacturing the same.

Electron-emitting sources are used in an electron gun as a constituent component of the picture tube of, e.g., a television. Such an electron gun (cathode) has a basic arrangement like the one shown in FIG. 14 in which an electron-emitting layer 1402 is formed at the closed distal end of a cathode cylinder 1401. The cathode cylinder 1401 incorporates a heater 1403.

The cathode cylinder 1401 is made of high-purity Ni doped with a reducing agent such as magnesium or silicon, and has a thickness of about 0.1 mm. The electron-emitting layer 1402 is made of a so-called ternary oxide of barium oxide, calcium oxide, and strontium oxide. When the electron-emitting layer 1402 is heated to about 800° C. by the heater 1403, barium is mainly reduced and liberated. The free barium moves toward the surface of the electron-emitting layer 1402 to facilitate electron emission. Emitted electron beams are collected by a first grid 1404 and focused on a phosphor screen 1409 via a second grid 1405, a third grid 1406, a fourth grid 1407 serving as a focusing electrode, and a fifth grid 1408 (FIG. 14B).

In this manner, the electron-emitting source is used in vacuum. Such electron-emitting sources are used in not only the electron gun of the picture tube but also a vacuum fluorescent display apparatus. This display apparatus is an electron tube using emitted light obtained by bombarding electrons emitted by the electron-emitting source against the phosphor within a vacuum vessel having at least one transparent end. In many cases, the vacuum fluorescent display apparatus employs a triode structure having a grid for controlling the movement of electrons. In the vacuum fluorescent display apparatus, a cathode called a filament has conventionally been used for the electron-emitting source, and thermoelectrons emitted from the cathode are bombarded against the phosphor to emit light.

Such fluorescent display apparatuses include an image tube constituting the pixel of a large-screen display apparatus. The arrangement of an electron-emitting source used in the image tube will be described with reference to FIG. 15.

The respective components of the image tube are stored in a cylindrical glass valve 1501 constituting a vacuum vessel. The glass valve 1501 incorporates a cathode structure 1510 serving as an electron-emitting source. The cathode structure 1510 has the following arrangement. A back electrode 1512 is formed at the center of a ceramic substrate 1511. A filament cathode 1513 is fixed above the back electrode 1512 at a predetermined interval. An elliptical grid housing 1514 having a mesh portion 1514a is mounted on the ceramic substrate 1511 to cover the back electrode 1512 and the filament cathode 1513. The mesh portion 1514a spherically projects toward a phosphor screen (not shown) arranged inside the glass valve 1501.

The image tube having this arrangement emits electrons from the cathode structure 1510 in the following manner. A predetermined voltage is applied to the filament cathode 1513 to emit thermoelectrons. A negative voltage with respect to the filament cathode 1513 is applied to the back electrode 1512. A positive voltage with respect to the filament cathode 1513 is applied to the grid housing 1514.

Then, an electron beam is emitted from the mesh portion 1514a of the grid housing 1514. The electron beam lands on a phosphor screen (not shown) to cause the phosphor screen to emit light.

As described above, thermoelectron emission using an electron-emitting substance is basically adopted in a conventional electron-emitting source used in an apparatus such as a picture tube or a vacuum fluorescent display apparatus using emission by the phosphor upon bombardment of electrons. The electron-emitting substance is made of a so-called ternary oxide of barium oxide, calcium oxide, and strontium oxide. Barium in this ternary oxide is consumed upon reaction with gas during use, and thus the tube is always replenished with barium from the electron-emitting layer. However, barium replenishment is insufficient even if a large current is flowed to emit many electrons. In addition, the electron-emitting substance is heated by electron emission but deteriorated by heat.

Oxides constituting the electron-emitting substance are very unstable in air. For this reason, in manufacturing a conventional electron-emitting source, an electron-emitting layer is first formed from so-called carbonates such as barium carbonate, calcium carbonate, and strontium carbonate, incorporated in a vacuum vessel together with other components, and oxidized while the vacuum vessel is evacuated and aged. Accordingly, manufacturing the conventional electron-emitting source requires many steps.

The electron flow emitted by the conventional electron-emitting source greatly depends on the temperature of the electron-emitting source. If the temperature of the electron-emitting source varies depending on the place, the electron flow also varies.

The conventional electron-emitting source is made of the electron-emitting substance, as described above. However, this substance is weak with respect to the gas produced in the vacuum vessel of the vacuum fluorescent display apparatus and may deteriorate within a short time.

In short, the conventional electron-emitting source suffers the problems of a cumbersome manufacturing process, variations in emitted current flow, low environmental resistance, and a weak structure.

SUMMARY OF THE INVENTION

It is therefore an object of the present invention to provide a resistant electron-emitting source which can emit a larger number of electrons and can be easily manufactured.

To achieve the above object, according to an aspect of the present invention, the electron-emitting source is made of carbon nanotubes formed from a columnar graphite layer. The carbon nanotubes may be formed from a multilayer graphite column whose tip is open. In general, a plurality of carbon nanotubes aggregate to a needle-like structure.

With this structure, electrons can be emitted from the tips of the carbon nanotubes upon application of the voltage to the carbon nanotubes in vacuum.

According to another aspect of the present invention, the electron-emitting source is constituted by fixing the carbon nanotubes to the substrate with a conductive adhesive.

With this structure, electrons can be emitted from the tips of the carbon nanotubes upon application of the voltage to the carbon nanotubes via the substrate in vacuum.

According to still another aspect of the present invention, the electron-emitting source is constituted by recessing the substrate, and filling the recess with a plurality of carbon nanotubes.

With this structure, electrons can be emitted from the tips of the carbon nanotubes upon application of the voltage to the carbon nanotubes via the substrate in vacuum.

According to still another aspect of the present invention, a paste obtained by dispersing, in a conductive viscous solution, a plurality of needle-like structures each made of an aggregate of carbon nanotubes is prepared. A pattern of this paste is formed on the substrate. Portions except for the needle-like structures are removed from the surface of the pattern by a predetermined amount to at least partially expose the needle-like structures, thereby manufacturing an electron-emitting source in which the carbon nanotubes are fixed to the substrate. The portions except for the needle-like structures are removed by laser irradiation or plasma processing.

With this processing, the needle-like structures can be exposed. By laser irradiation, the portions of the needle-like structures except for the carbon nanotubes can be removed to expose the electron-emitting tips.

According to still another aspect of the present invention, a paste obtained by dispersing, in a conductive viscous solution, a plurality of needle-like structures each made of an aggregate of carbon nanotubes is prepared. A pattern of this paste is formed on the substrate. Portions except for the needle-like structures are removed from the surface of the pattern by a predetermined amount to at least partially expose the needle-like structures. In addition, portions except for the carbon nanotubes are removed from the tips of the needle-like structures by a predetermined amount to expose the tips of the carbon nanotubes, thereby manufacturing an electron-emitting source in which the carbon nanotubes are fixed to the substrate. The portions except for the needle-like structures are removed by exposing the pattern to an oxygen or hydrogen gas plasma.

With this processing, the electron-emitting tips can be exposed.

BRIEF DESCRIPTION OF THE DRAWINGS

FIGS. 1A to 1F are views showing the arrangement of an electron gun using an electron-emitting source according to the first embodiment of the present invention;

FIGS. 5A to 5C are views for explaining a method of manufacturing an electron-emitting source according to the fourth embodiment of the present invention;

FIG. 11 is a plan view showing the arrangement of the FED using the electron-emitting source according to the ninth embodiment of the present invention;

FIG. 12 is a sectional view showing the arrangement of an FED using an electron-emitting source according to the 10th embodiment of the present invention;

FIG. 13 is a sectional view showing the arrangement of an FED using an electron-emitting source according to the 11th embodiment of the present invention;

DESCRIPTION OF THE PREFERRED EMBODIMENTS

Figure 2A:
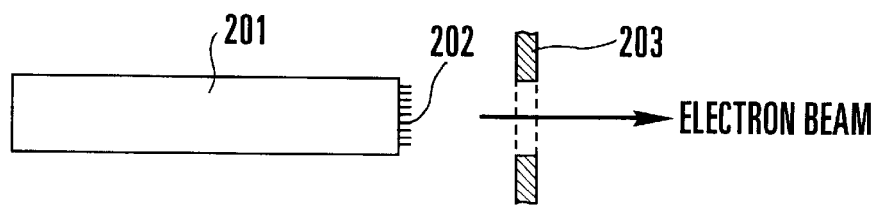
FIGS. 2A to 2D are views for explaining the electron gun using the electron-emitting source according to the first embodiment.

Embodiments of the present invention will be described in detail below with reference to the accompanying drawings.
First Embodiment FIGS. 1A, 1B, and 1C show the arrangement of an electron gun using an electron-emitting source according to the first embodiment of the present invention.

This electron gun comprises a stage 102 movable in the x and y directions on a base 101. A needle-like emitter (electron-emitting source) 103 is arranged on the movable stage 102. An extraction electrode 104 is fixed to the base 101 on the extended line from the tip of the needle-like emitter 103. The extraction electrode 104 has an aperture 104a.

More specifically, the electron gun is constituted by a field emission type cold cathode electron source made up of the needle-like emitter 103 and the extraction electrode 104. The electron extraction efficiency can be optimized by moving the movable stage 102 and controlling the position and orientation of the tip of the needle-like emitter 103 with respect to the aperture 104a.

In the first embodiment, the needle-like emitter 103 serving as an electron-emitting source is made of an aggregate of carbon nanotubes. More specifically, the needle-like emitter 103 is constituted by bundling a plurality of needle-like graphite columns (needle-like structures) which have a length of several ten $\mu$m and are made of an aggregate of carbon nanotubes, while the longitudinal directions of the columns substantially coincide with each other. The needle-like emitter 103 has a length of about 5 mm and a diameter of 1 to 3 mm, and a portion of the needle-like emitter 103 about 0.5 to 1 mm from the tip is tapered.

The carbon nanotube will be explained. As shown in FIG. 1D, this carbon nanotube is a fully graphitized cylinder having a diameter of about 4 to 50 nm and a length in 1 $\mu$m order. As shown in FIG. 1E, the tip of the carbon nanotube is closed by a five-membered ring. Note that the tip may be bent and open.

When two carbon electrodes are placed in helium gas at a gap of about 1 to 2 mm, and a DC arc discharge is caused, a carbon nanotube is formed in a deposit aggregated at the distal end of the cathode-side carbon electrode upon evaporation of carbon of the anode-side carbon electrode.

That is, if a stable arc discharge is continuously performed in helium while the gap between carbon electrodes is kept at about 1 mm, a deposited column having almost the same diameter as that of the anode-side carbon electrode is formed at the distal end of the cathode-side carbon electrode.

The deposited column is made up of two parts, i.e., an outer hard husk and a black inner fragile core. The inner core has a fibrous tissue extending in the direction of height of the deposited column. The fibrous tissue is the graphite column described above. The graphite column can be obtained by cutting the deposited column. Note that the outer hard husk is polycrystalline graphite.

The graphite column is made of an aggregate of carbon nanotubes together with carbon nanopolyhedorons. As shown in FIG. 1F, a graphite column 131 is a needle-like structure formed from an aggregate of carbon nanotubes 132 in almost the same direction. FIG. 1E shows the section of an intermediate portion of the graphite column.

FIGS. 1D and 1E schematically show a graphite column in which a single graphite layer is cylindrically closed. However, the graphite column is not limited to this shape, and may have a shape in which a plurality of graphite layers are stacked in a nested structure, and each graphite layer is cylindrically closed to attain a coaxial multilayer structure. The center of the structure is hollow.

In the first embodiment, the electron gun is constituted by a field emission type cold cathode electron source made up of the needle-like emitter 103 formed from carbon nanotubes, and the extraction electrode 104. According to the first embodiment, the current density (emission amount) was 10 A/cm$^2$, and is theoretically 400 A/cm$^2$.

Since the position of the needle-like emitter 103 can be controlled by the movable stage 102, even if the tip of the needle-like emitter 103 deteriorates and wears, the needle-like emitter 103 can be moved toward the extraction electrode 104, and high electron emission efficiency can be easily maintained.

Figure 2B:
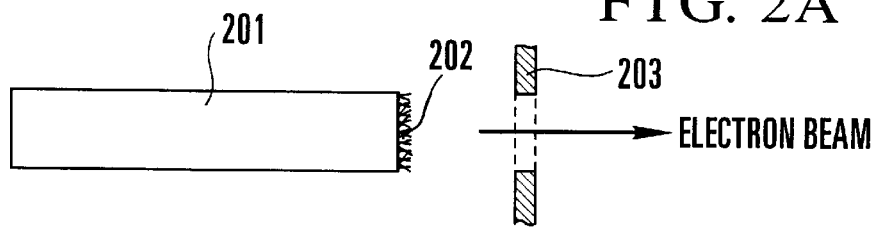

In the above arrangement, the emitter is constituted by bundling graphite columns while their longitudinal directions substantially coincide with each other, but the emitter is not limited to this arrangement. As shown in FIGS. 2A and 2B, a plurality of graphite columns 202 are arranged at the distal end of a cathode cylinder 201, and the electric field is applied between the cathode cylinder 201 and an extraction electrode 203 to extract electrons from the graphite columns 202. The graphite columns 202 are fixed to the cathode cylinder 201 with, e.g., a conductive adhesive. The conductive adhesive is, e.g., a silver paste prepared by dispersing silver particles in a vehicle in addition to low-softening-point frit glass particles as a fixing binder. Note that the vehicle is a viscous liquid in which a resin is dissolved in a solvent, and has excellent heating decomposability and volatility. A typical vehicle is one prepared by dissolving ethyl cellulose in terpineol.

In this case, as shown in FIG. 2A, the longitudinal direction of the graphite column 202 is preferably aligned with the electron extraction direction as much as possible.

Figure 2C:
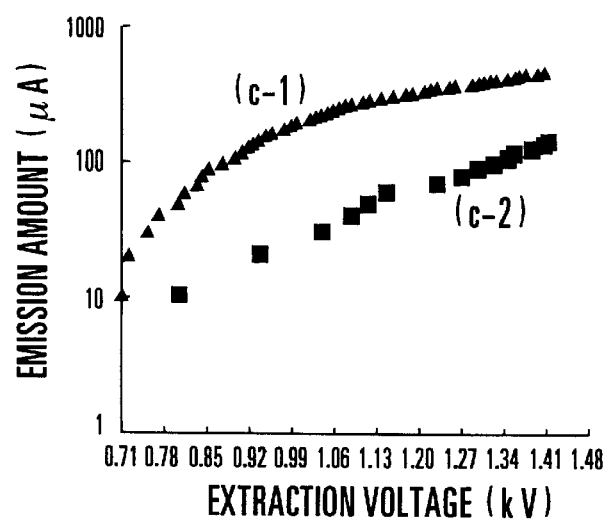

FIG. 2C shows the difference in emission amount depending on the longitudinal direction of the graphite column. In FIG. 2C, (c-1) represents the emission amount when the longitudinal direction of the graphite column 202 substantially coincides with the electron extraction direction, as shown in FIG. 2A. (c-2) represents the emission amount when the longitudinal direction of the graphite column 202 does not much coincide with the electron extraction direction, as shown in FIG. 2B.

As is apparent from FIG. 2C, a larger emission amount can be obtained when the longitudinal direction of the graphite column coincides with the electron extraction direction.

Figure 2D:
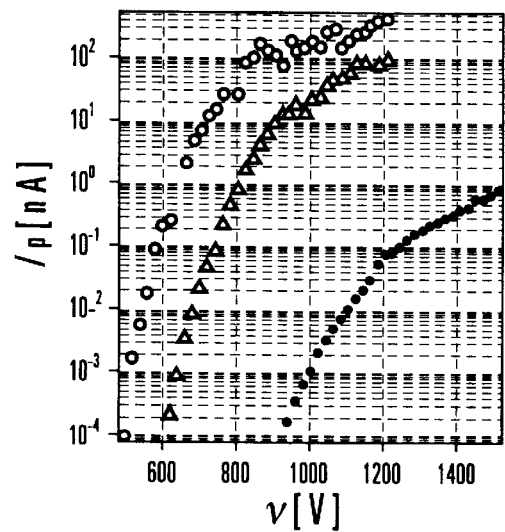

As described above, the carbon nanotube may have a monolayer or multilayer structure, a structure in which the tip is closed by a five-membered ring, or a structure in which the tip is open without any five-membered ring. When a multilayer carbon nanotube whose tip is open is used, a larger number of electrons can be emitted, as indicated by ○ in FIG. 2D. In FIG. 2D, ▲ represents the current-to-voltage characteristics of electrons emitted by a monolayer carbon nanotube, and • represents the current-to-voltage characteristics of electrons emitted by a multilayer carbon nanotube whose tip is closed by a five-membered ring. In FIG. 2D, the current is a probe current ($I_P$) measured using probe holes 1 mm in diameter. The current is not a total emitted current. The distance between probe holes is 60 mm.

Second Embodiment

Figure 3:
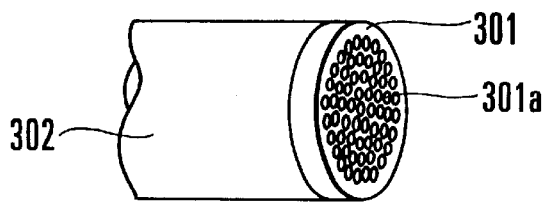
FIG. 3 is a view showing the arrangement of the main part of an electron gun using an electron-emitting source according to the second embodiment of the present invention.

FIG. 3 shows an electron-emitting source according to the second embodiment of the present invention.

In the second embodiment, a disk-like distal end portion 301 having a plurality of recesses 301a on its front surface is attached to the distal end of a cylindrical cathode 302, and the recesses 301a of the distal end portion 301 are filled with an aggregate of carbon nanotubes.

More specifically, the recesses 301a are filled with a plurality of needle-like graphite columns which have a length of several ten $\mu$m and are made of an aggregate of carbon nanotubes, while the longitudinal directions of the columns substantially coincide with each other. The distal end portion 301 has a thickness of about 5 mm and a diameter of about 5 mm, and comprises a plurality of recesses 301a about 0.5 mm in hole diameter. As a material for forming the distal end portion 301 serving as a substrate, a nickel alloy, stainless steel, or a 426-alloy is available.

A graphite column powder made of an aggregate of carbon nanotubes is packed into the recesses 301a at a pressure of about 5 to 6 kgw. For example, the formation surface for the recesses 301a of the distal end portion 301 is covered with the graphite column powder, and the powder is pressed by a roller or the like. The graphite column powder may be printed in the recesses 301a by doctor blading.

In the second embodiment, the electron-emitting source is constituted by the distal end portion 301 having the recesses 301a filled with carbon nanotubes. If the distal end portion 301 replaces the emitter 103 shown in FIGS. 1A, 1B, and 1C, the electron gun can be constituted by a field emission type cold cathode electron source, similar to the first embodiment. In constituting the electron gun, the formation surface for the recesses 301a of the distal end portion 301 is arranged to direct the extraction electrode 104 shown in FIGS. 1A, 1B, and 1C. When the electron gun was constituted in this manner, the current density (emission amount) was 10 A/cm$^2$ or more, and is theoretically 400 A/cm$^2$.

The carbon nanotube is filled in and fixed to the recesses 301a without any binder. The carbon nanotube is not covered with a binder, which facilitates emission from the tip of the carbon nanotube.

The electron gun has been exemplified, but the application of the electron-emitting source is not limited to this. For example, the electron-emitting source can be applied to a vacuum fluorescent display apparatus as follows.

In this case, the electron-emitting source is arranged inside a vacuum vessel constituting the vacuum fluorescent display apparatus. An anode having a phosphor layer is arranged in the vacuum vessel to face the electron-emitting source. Electrons emitted by the electron-emitting source are bombarded against the phosphor layer. The anode may be used as an extraction electrode, or an extraction electrode may be arranged between the phosphor layer and the electron-emitting source.

Third Embodiment

The third embodiment of the present invention will be explained.

Figure 4:
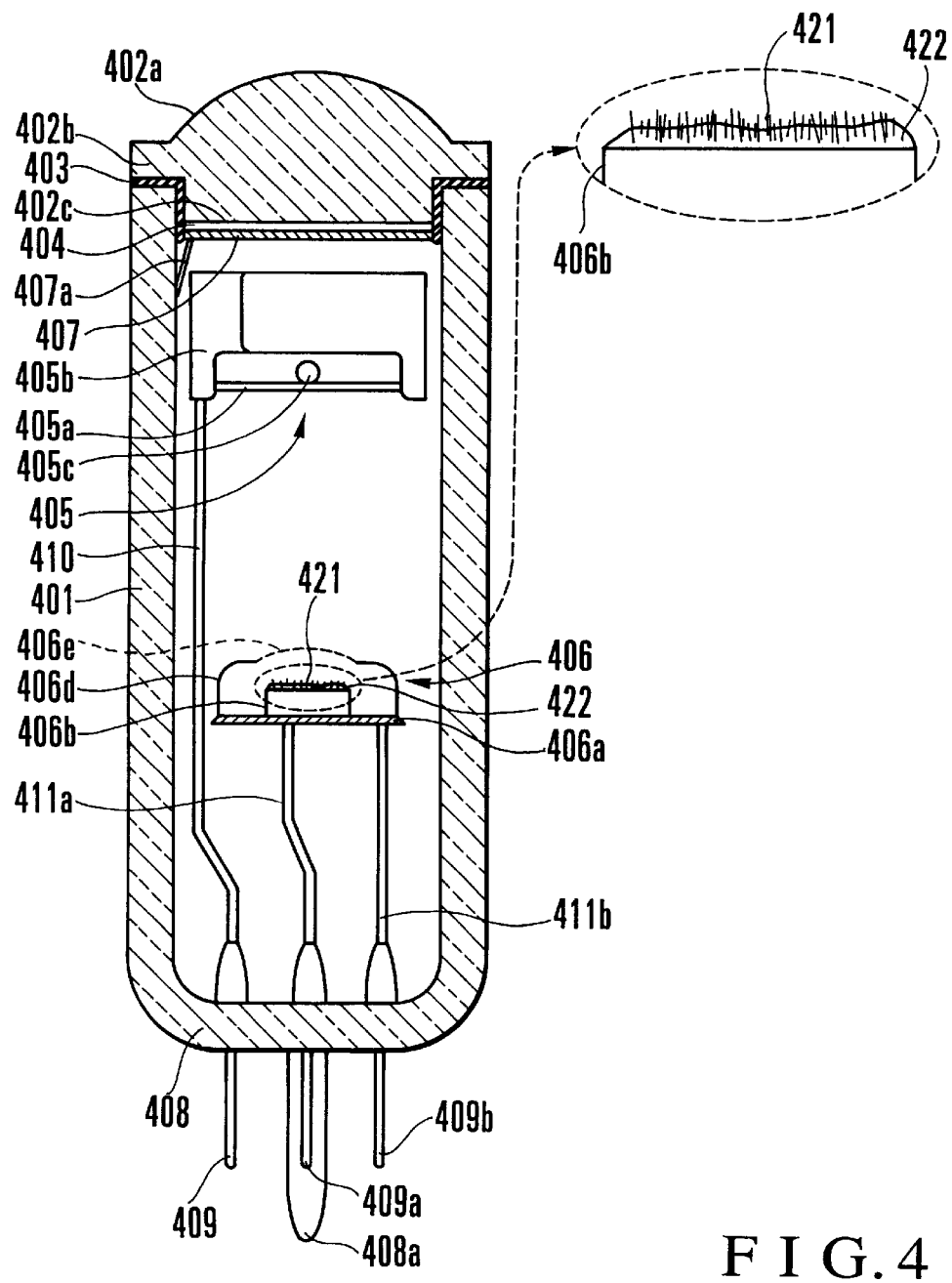
FIGS. 4A and 4B are sectional views showing the arrangement of an image tube as a vacuum fluorescent display apparatus using an electron-emitting source according to the third embodiment of the present invention.

FIG. 4A shows the arrangement of an image tube as a vacuum fluorescent display apparatus using an electron-emitting source according to the third embodiment.

The arrangement and manufacturing method of the image tube in the third embodiment will be described. A glass faceplate 402 is fixed to a cylindrical glass valve 401 with a low-melting frit glass 403 to constitute a vacuum vessel (envelope).

The vacuum vessel incorporates a phosphor screen 404, an anode structure 405, and a cathode structure 406 serving as an electron-emitting source. Needless to say, the glass faceplate 402 is adhered and fixed to the glass valve 401 after the phosphor screen 404, the anode structure 405, and the cathode structure 406 serving as an electron-emitting source are arranged.

A convex-lens-shaped spherical portion 402a is formed on the front side of the glass faceplate 402, and a collar step portion 402b is formed at the peripheral portion. Although not shown, the peripheral portion of an inner surface 402c of the glass faceplate 402 is partially recessed. The phosphor screen 404 is formed on the major surface of the inner surface 402c, and an Al metal-back film 407 is formed on the surface of the phosphor screen 404.

In the recess, no phosphor screen 404 formed, and only the Al metal-back film 407 is formed. In the recess, one end of an elastic contact piece 407a formed by press-molding, e.g., a thin stainless steel plate is inserted. The contact piece 407a is adhered and fixed to the recess with a conductive adhesive as a mixture of, e.g., carbon or silver and frit glass. The other end of the contact piece 407a extends to the inner wall of the glass valve 401.

The phosphor screen 404 is formed by applying and drying a solution prepared by dissolving a phosphor mixture of, e.g., $Y_2O_2S$: Tb+$Y_2O_3$ : Eu as a white phosphor in a solvent to a thickness of about 20 $\mu$m on the inner surface 402c by printing. Note that no phosphor screen 404 is formed in the recess.

The Al metal-back film 407 is formed by depositing an aluminum film to a thickness of about 150 nm on the surface of the phosphor screen 404. Since no phosphor screen 404 is formed in the recess, only the Al metal-back film 407 is formed.

If the Al metal-back film 407 is too thin, pinholes increase to weaken reflection by the phosphor screen 404; if the Al metal-back film 407 is too thick, entrance of electrons of the electron beams into the phosphor screen 404 is inhibited, and emitted light becomes weak. It is therefore important to control the thickness of the Al metal-back film 407. A preferable thickness of the Al metal-back film 407 is about 150 nm, as described above.

After the phosphor screen 404 and the Al metal-back film 407 are formed, the glass faceplate 402 is calcinated by, e.g., an electric furnace in air at 560° C. for about 30 min to remove the solvent and the like contained in the applied film.

The collar-like step portion 402b formed at the peripheral portion of the glass faceplate 402 is adhered and fixed with the low-melting frit glass 403 to one opening end of the glass valve 401 about 20 mm in diameter and about 50 mm in length whose two ends are cut off.

A lead pin 409 is inserted in a stem glass 408 constituting the bottom of the glass valve 401, and the stem glass 408 is integrally formed with a pumped tube 408a. An anode lead 410 is fixed to the tip of the lead pin 409 by welding, and a cylindrical anode structure (electron-accelerating electrode) 405 is fixed to the tip of the anode lead 410 by welding.

The anode structure 405 is constituted by:

a ring-like anode 405a prepared by rounding, e.g., a stainless steel wire (diameter: about 0.5 mm) into a ring shape; and a cylindrical anode 405b formed by winding a thin rectangular stainless steel plate (thickness: 0.01 to 0.02 mm) around the outer surface of the ring-like anode 405a, and fixing two overlapping portions by welding or the like.

The anode structure 405 is fixed such that the ring-like anode 405a is welded to the tip of the anode lead 410 at a predetermined portion, and the inner portion of the cylindrical anode 405b in contact with the extreme tip of the anode lead 410 is welded. A Ba getter 405c is attached to part of the ring-like anode 405a by welding. FIG. 4A does not show the sections of the anode structure 405 and the lead pin 409.

The above arrangement is almost the same as that of a conventional image tube.

Lead pins 409a and 409b are also inserted in the stem glass 408. Cathode leads 411a and 411b are fixed to the tips of the lead pins 409a and 409b by welding, and the cathode structure 406 is fixed to the tips of the cathode leads 411a and 411b by welding.

The cathode structure 406 has the following arrangement. An electrode (conductive plate) 406b is arranged on the center of a ceramic substrate 406a. As shown in FIG. 4B, needle-like graphite columns 421 which have a length of several ten $\mu$m to several mm and are made of an aggregate of carbon nanotubes are fixed in a region having a diameter of about 3 mm on the electrode 406b, while their longitudinal directions substantially coincide with the direction to the phosphor screen 404.

In the third embodiment, the graphite columns 421 are fixed with a conductive adhesive 422. The electrode 406b and the graphite columns 421 fixed with the conductive adhesive 422 constitute an electron-emitting source.

The electrode 406b and the graphite columns 421 are covered with a housing 406d having a mesh portion (electron extraction electrode) 406e.

In this way, the cathode structure 406 is constituted by fixing the graphite columns 421 made of carbon nanotubes to the electrode 406b, and mounting the housing 406d on the ceramic substrate 406a so as to cover them.

The mesh portion 406e slightly spherically is projects toward the phosphor screen 404. The mesh portion 406e may be flat. The housing 406d is formed by press-molding a stainless steel plate about 100 $\mu$m in thickness. The mesh portion 406e has a length of about 6 mm, a width of about 4 mm, and a height of about 1.25 mm. The mesh portion 406e is apart 0.5 to 1 mm from the tip of the graphite column 421. The interval between them is preferably small as far as they are not in contact with each other.

In the image tube of the third embodiment having the above arrangement, the voltage is applied from an external circuit to the lead pins 409a and 409b to apply the electric field between the electrode 406 and the housing 406d via the cathode leads 411a and 411b. This concentrates a high electric field at the tips of the carbon nanotubes of the graphite columns 421 fixed to the electrode 406 to extract electrons and emit them from the mesh portion 406e. That is, in the third embodiment, the cathode structure 406 is a field emission type cold cathode electron source (electron-emitting source) using, as an emitter, carbon nanotubes 421a constituting the graphite columns 421.

A high voltage is applied from an external circuit to the lead pin 409, and to the Al metal-back film 407 through the anode lead 410, the anode structure 405 (cylindrical anode 405b), and the contact piece 407a. Then, emitted electrons are accelerated by the cylindrical anode 405b and bombarded against the phosphor screen 404 through the Al metal-back film 407. As a result, the phosphor screen 404 is excited by electron bombardment to emit light in a color corresponding to the phosphor constituting the phosphor screen 404 to the front screen through the glass faceplate 402.

Also in the third embodiment, the electron-emitting source is made of carbon nanotubes and used as a field emission type cold cathode electron source. According to the third embodiment, the electron-emitting source can be easily used without any deterioration by a gas produced in the vacuum vessel because of the absence of a fragile component such as a filament.

Since no filament heating power supply is required, the number of lead pins can be decreased, and the power consumption can be reduced.

The third embodiment has exemplified the image tube, but is not limited to this. The electron-emitting source can also be applied to another vacuum fluorescent display apparatus having a light-emitting portion made of a phosphor in the vacuum vessel.

For example, this electron-emitting source can be similarly applied to an image tube which changes the emission color with an optical filter between the glass faceplate and the phosphor screen, and to an image tube which realizes a multicolor display with a plurality of phosphor screens in a single vacuum vessel.

Further, the electron-emitting source can also be applied to a flat tube which displays characters in desired shapes with a phosphor screen in a desired shape.

Fourth Embodiment

In the third embodiment, the electron-emitting source is manufactured by fixing the graphite column to the electron with a conductive adhesive. However, the manufacturing method is not limited to this.

A method of manufacturing an electron-emitting source according to the fourth embodiment of the present invention will be described below.

As described above, when two carbon electrodes are placed in helium gas at a gap of about 1 to 2 mm, and a DC arc discharge is caused, a carbon nanotube is formed in a deposit aggregated at the distal end of the cathode-side carbon electrode upon evaporation of carbon of the anode-side carbon electrode.

This will be explained in more detail.

As shown in FIG. 5A, an anode-side carbon electrode 502 and a cathode-side carbon electrode 503 are arranged in a closed vessel 501. The carbon electrode 502 is connected to a current inlet terminal 502a, whereas the carbon electrode 503 is connected to a current inlet terminal 503a. The carbon electrode 502 is movable in the right and left directions in FIG. 5A by a slightly moving mechanism 504 capable of linear movement. Low-pressure helium gas is filled in the closed vessel 501.

In this arrangement, the current inlet terminal 502a is connected to a terminal (+), and the current inlet terminal 503a is connected to a terminal (−). While the electrodes 502 and 503 are set at an interval of about 1 mm, a DC current is flowed to cause an arc discharge. Then, as shown in FIG. 5A, carbon of the anode-side carbon electrode 502 evaporates. The evaporated carbon recrystallizes to form a deposit 505 on the distal end of the cathode-side carbon electrode 503.

The electrode 502 is moved by the slightly moving mechanism 504 along with the growth of the deposit 505 so as to always keep the interval between the deposit 505 and the carbon electrode 502 at about 1 mm. Consequently, as shown in FIG. 5B, the deposit 505 grows to a deposited column 506 on the distal end of the carbon electrode 503. The deposited column 506 is made up of two parts, i.e., an outer hard husk 506a and a black inner fragile core 506b. The inner core 506b has a fibrous tissue extending in the direction of height of the deposited column 506. The fibrous tissue is an above-mentioned graphite column as an aggregate of carbon nanotubes. The graphite column is made up an aggregate of carbon nanotubes together with carbon nanopolyhedorons. Note that the outer hard husk 506a is polycrystalline graphite.

As shown in FIG. 5C, the deposited column 506 is cut in a predetermined length to form a deposit body 506c as an aggregate of graphite columns. As shown in FIG. 5D, the deposit body 506c is fixed to the upper surface of an electrode 507 with a conductive adhesive 508 with the cut surface facing upward, thereby forming an electron-emitting source. Even the electron-emitting source manufactured in this manner can be used in place of the electron-emitting source according to the third embodiment in which the graphite column 421 is fixed to the electrode 406b with the conductive adhesive 422.

In the electron-emitting source according to the fourth embodiment, the longitudinal directions of a plurality of carbon nanotubes coincide with the normal line of the plane of the electrode 507.

Fifth Embodiment

A method of manufacturing an electron-emitting source according to the fifth embodiment of the present invention will be described.

Figure 6A:
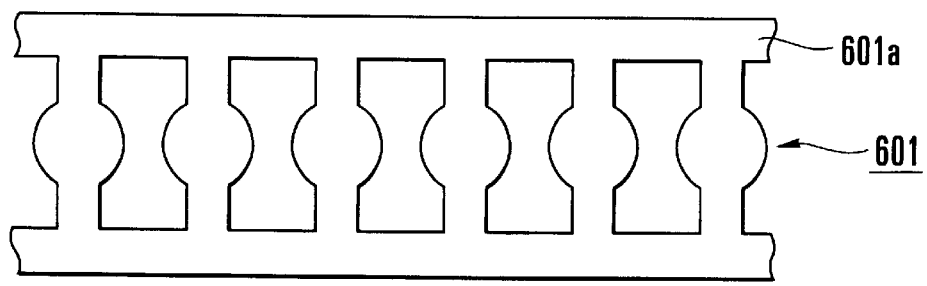
FIGS. 6A to 6E are views for explaining a method of manufacturing an electron-emitting source according to the fifth embodiment of the present invention.

As shown in FIG. 6A, a metal plate is processed to connect a plate-like substrate 601 in a predetermined shape to a lead frame 601a.

Figure 6B:
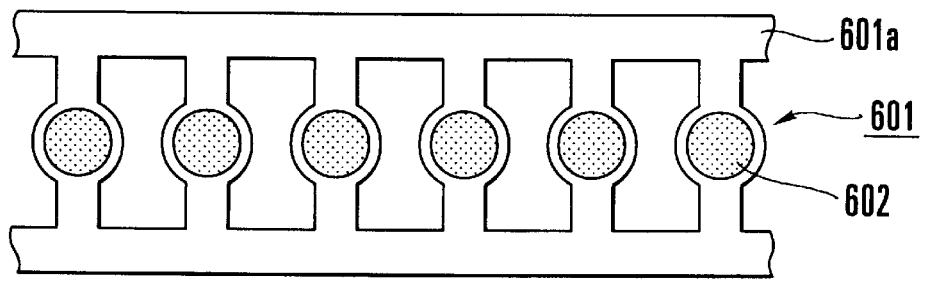

As shown in FIG. 6B, a conductive adhesive 602 such as a silver paste is applied to a predetermined region on the surface of the substrate 601.

Figure 6C:
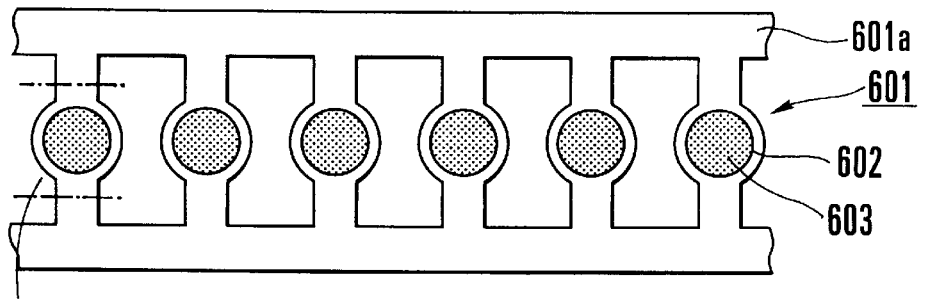

As shown in FIG. 6C, a graphite column 603 is formed on the conductive adhesive 602 so as to make the longitudinal direction of the graphite column 603 be perpendicular to the plane of the substrate 601. The conductive adhesive 602 is calcinated by heating in, e.g, an oxygen-containing atmosphere at about 400° C. to 600° C., thereby fixing the graphite column 603 to the substrate 601.

A pattern of the conductive adhesive 602 may be formed by photolithography using a photosensitive resist. In this case, the conductive adhesive must be photosensitive, which can be realized by adding, e.g., diazonium salts and zinc chloride.

Figure 6D:
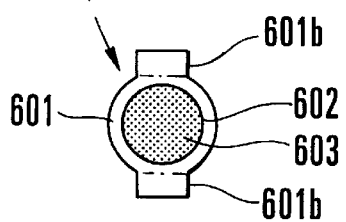

As shown in FIG. 6D, the substrate 601 having the graphite column 603 is cut from the frame 601a.

Figure 6E:
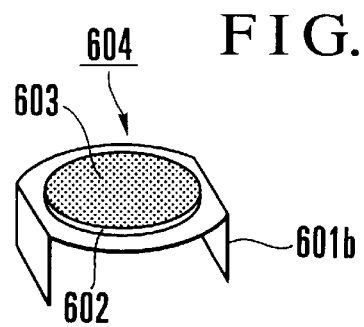

Two ends 601b of the substrate 601 are bent to form an electrode 604 with the graphite column 603 fixed to its surface, as shown in FIG. 6E. That is, an electron-emitting source is formed. With this procedure, a plurality of electrodes each having a graphite column fixed in advance as an electron-emitting source can be formed. Each electrode can be used as, e.g., the cathode structure 406 of the image tube in the third embodiment. It is also possible that the electron emission characteristics of manufactured electron-emitting sources are checked in advance, and only ones excellent in characteristics are used.

Formation of the graphite column 603 on the substrate 601 in FIG. 6C can be modified such that a fine powder of the graphite column 603 is blown onto the substrate 601 with a nozzle. In this case, the longitudinal direction of the graphite column 603 is made to be perpendicular to the plane of the substrate 601. An example of the used nozzle is one tapered toward its tip having an opening diameter of about 0.1 to several mm. The air discharge pressure of the nozzle is about 1 to several kg/cm$^{-2}$. The used air is dry air such as normal air or nitrogen gas having a low humidity.

Under these conditions, the graphite column 603 is blown to the conductive adhesive 602 while the longitudinal direction of the graphite column 603 is almost perpendicular to the plane of the substrate 601.

Formation of the graphite column 603 on the substrate 601 in FIG. 6C can also be modified as follows.

A graphite column powder is sprinkled to the substrate 601 and the frame 601*a* to form the graphite column powder layer on them. The graphite column powder layer is deposited on not only the conductive adhesive 602 but also the remaining region. The column graphite powder is removed from the region except for the conductive adhesive 602 by blowing air, thereby leaving the graphite column 603 on only the conductive adhesive 602, as shown in FIG. 6C.

The graphite column 603 may be formed by pressing the formation surface of the conductive adhesive 602 in the state shown in FIG. 6B against the graphite column powder.

Formation of the graphite column 603 on the substrate 601 in FIG. 6C can also be modified as follows.

A pattern of a graphite column paste is formed in a predetermined region on the surface of the substrate 601, and at least part of the graphite column is exposed on the surface by removing part of the surface. As a result, the graphite column 603 is fixed to the substrate 601.

The graphite column paste is prepared by mixing graphite columns in a known silver paste (conductive paste). The pattern is formed by screen printing using the paste as an ink. After the paste pattern is formed by printing or the like, the solvent and the like in the paste are volatilized, and the resultant paste is calcinated by heating in air at about 400 to 600° C. for 15 to 60 min to make the pattern rigid. This calcination may be performed in vacuum at, e.g., about 1 to 10 Torr.

In the formed paste pattern, the graphite column is covered with another paste component. For this reason, part of the graphite column is exposed by, e.g., polishing the top of the pattern.

When the graphite column 603 is formed on the substrate 601 using the graphite column paste, part of the graphite column may be exposed as will be described in the sixth embodiment.

Sixth Embodiment

A method of manufacturing an electron-emitting source according to the sixth embodiment of the present invention will be described.

If the top of the paste pattern is cut and polished to expose part of the graphite column on the paste pattern, cutting dust is generated and must be cleaned. In addition, cutting and polishing are difficult to uniformly expose carbon nanotubes on the surface of the graphite column.

In the sixth embodiment, carbon nanotubes constituting the electron-emitting source are uniformly exposed by, e.g., laser irradiation.

The manufacture of the electron-emitting source will be explained.

A bundle paste is prepared by kneading a needle-like bundle (graphite column) mainly containing carbon nanotubes and having a length of about ten $\mu$m, and a silver paste (conductive viscous solution) at a kneading ratio of 1:1. The silver paste is a fluid paste in which silver particles (metal particles) about 1 $\mu$m in diameter are dispersed together with glass particles about 1 $\mu$m in diameter in a viscous vehicle obtained by dissolving a resin in a solvent. As the vehicle, a material excellent in decomposability and volatility which can be removed by heating in air at about 300 to 400° C. is used. As the glass particle, one which fuses at about 300 to 400° C. is used.

Figure 7A:
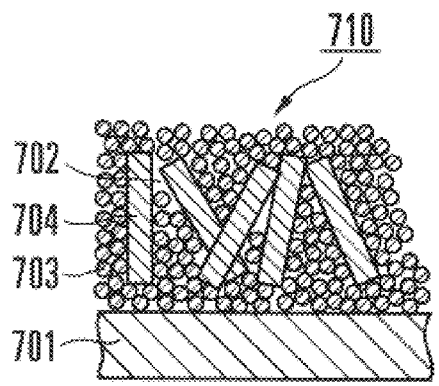
FIGS. 7A, 7C, and 7F are sectional views for explaining a method of manufacturing an electron-emitting source according to the sixth embodiment of the present invention.

The bundle paste is applied into a pattern by, e.g., screen printing on a predetermined metal disk (metal plate) made of, e.g., a nickel alloy, stainless steel, or a 426-alloy. Together with the metal plate, the paste pattern formed on it is calcinated by heating at about 450° C. for a predetermined time. As a result, as shown in FIG. 7A, a printed pattern 710 is formed on a metal plate (substrate) 701 such that bundles 704 are covered with silver particles 703 bonded by binders 702 obtained by fusing the glass particles.

The printed pattern 710 made of the bundles 704 can be easily formed in a desired shape by printing the paste. Since the electron-emitting source must flow the current, the whole electron-emitting source is made conductive by adding the silver particles 703. In the bundle paste, the bundles 704 and the silver particles 703 are substantially uniformly dispersed. Also in the printed pattern 710, therefore, a plurality of bundles 704 are nearly uniformly dispersed.

The carbon nanotubes constituting the bundles 704 can be used as a field emission type cold cathode electron source. The carbon nanotube is a fine needle-like structure having a diameter of about 4 to 50 nm and a length in 1 $\mu$m order. Accordingly, the electron-emitting source constituted by a plurality of bundles 704 as aggregates of carbon nanotubes comprises many field emission type cold cathode electron sources. That is, this electron-emitting source comprises many electron-emitting terminals.

In the printed pattern 710 formed from the bundle paste, many bundles 704 are uniformly dispersed. The electron-emitting source of the sixth embodiment has the structure in which the printed pattern 710 is formed on the metal plate 701, and many electron-emitting sources are formed in the surface of the printed pattern 710.

Figure 7B:
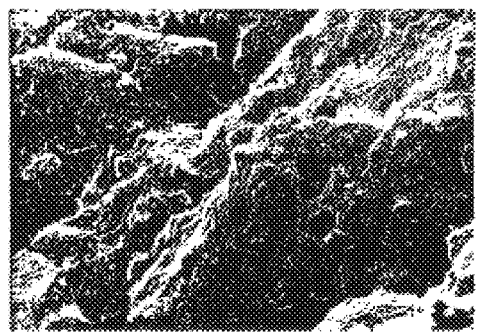
FIGS. 7B, 7D, and 7E are scanning electron micrographs.

As shown in FIG. 7A, however, the bundles 704 are rarely exposed on the surface of the printed pattern 710. This surface was observed with an electron microscope to find only silver particles bonded by binders, as shown in the electron micrograph in FIG. 7B. In this state, the carbon nanotubes having electron-emitting terminals are hidden. Even upon application of the electric field to the printed pattern 710, electrons are hardly emitted. For this reason, at least the bundles 704 must be exposed on the surface of the printed pattern 710.

Figure 7C:
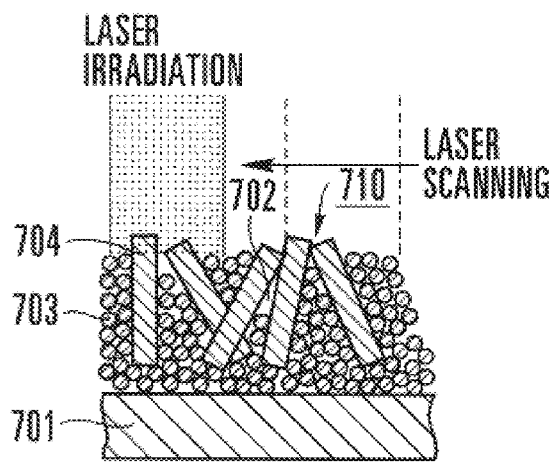
Figure 7D:
Figure 7E:
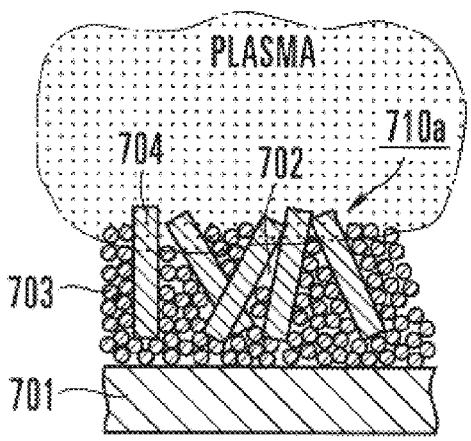

In the sixth embodiment, as shown in FIG. 7C, the surface of the printed pattern 710 is irradiated with a laser beam to selectively remove the silver particles 703 and the binders 702 in the surface and expose the bundles 704. This state was observed with an electron microscope to find the tips of bundles exposed on the surface, as shown in the electron micrograph in FIG. 7D. The silver particles 703 are removed by laser irradiation to expose the carbon nanotubes on the bundle surfaces, as shown in the electron micrograph in FIG. 7E.

As described above, the bundle is an aggregate of many carbon nanotubes together with carbon nanopolyhedorons. On the bundle surface, not only the carbon nanotubes but also the carbon nanopolyhedorons are exposed. Since the carbon nanopolyhedorons do not emit electrons, if only the carbon nanotubes are exposed on the bundle surface, a larger number of electrons can be emitted.

Since the carbon nanopolyhedorons as a carbon component other than the carbon nanotubes are selectively removed from the bundle surface by laser irradiation, only the carbon nanotubes are uniformly exposed on the bundle surface.

In laser irradiation, pulses are supplied using, e.g., a YAG laser at a voltage of 500 V, about 1.1 J, and an interval of 0.6 to 0.7 ms. The used laser is not limited to the YAG laser and may be a carbon dioxide gas laser. In this laser irradiation, if the irradiation power is insufficient, the silver particles and the glass particles bonding them are left on the surface, which obstructs electron emission; if the laser irradiation power is excessive, carbon nanotubes also fuse, scatter, and decrease.

According to the sixth embodiment, in the metal plate 701 having the printed pattern 710 constituting an electron-emitting source, many bundles 704 are exposed on the surface of the printed pattern 710. In addition, carbon nanotubes 705 are uniformly exposed on the surfaces of the bundles 704.

The sixth embodiment can therefore realize an electron-emitting source in which a plurality of carbon nanotubes each having an end portion for actually emitting electrons are uniformly exposed on the surface of the substrate (metal plate). The bundles in which the carbon nanotubes are uniformly exposed are fixed to the substrate together with silver particles as conductive particles, and thus the voltage can be applied to almost all the carbon nanotubes via almost all the bundles.

This electron-emitting source can be manufactured by a simple method in the order of pattern formation by, e.g., screen printing, calcination, and laser irradiation.

In the sixth embodiment, since the carbon nanotubes are exposed by laser irradiation, no cutting dust of silver particles and binders covering the bundles is generated. The carbon nanotubes can be uniformly exposed in the bundles.

In the sixth embodiment, the printed pattern is formed on the metal plate, but may be formed on an insulating substrate. In this case, an interconnection for applying the voltage to the printed pattern is required. In this embodiment, the silver paste is used as a conductive viscous solution, but the solution may be another conductive paste. For example, a conductive adhesive prepared by dispersing silver particles in an epoxy resin, a conductive paste using particles of an alloy of silver and copper, or a conductive polymer can be used.

The bundles and the carbon nanotubes are exposed by laser irradiation, but the exposure method is not limited to this. They may be exposed by selective dry etching using a plasma, to be described below.

Figure 7F:
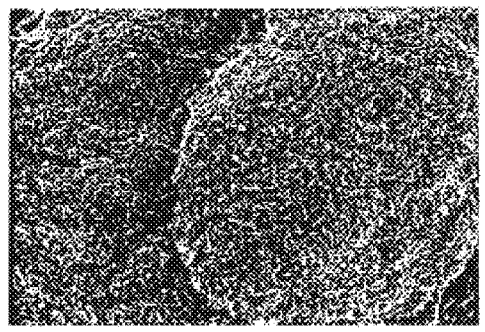

For example, the printed pattern 710 shown in FIG. 7A is exposed to, e.g., an argon gas plasma to selectively etch particularly the silver particles 703 in the surface, as shown in FIG. 7F. In this etching, the surface of the printed pattern 710 is dry-etched by mainly sputtering using an argon plasma (another inert gas plasma may be used). In the dry etching, the silver etching rate is higher about 20 times than the carbon etching rate. For this reason, while the carbon bundles 704 are hardly etched, the silver particles 703 can be selectively etched. As a result, the bundles 704 are exposed on the surface of a plasma-etched printed pattern 710*a*.

Removing the silver particles from the surface facilitates concentration of the electric field by the carbon nanotubes constituting the bundles 704 on the surface of the printed pattern 710*a* applied with the voltage.

If many silver particles exist on the surface, or the surface is substantially covered with the silver particles, the electric field is scattered by the silver particles present in the surface upon application of the voltage to a printed pattern. In the state of the printed pattern 710 shown in FIG. 7A, concentration of the electric field to the carbon nanotubes for actually emitting electrons is suppressed.

However, if the bundles 704 are exposed on the surface, and the conductive silver particles 703 hardly exist in the surface, the electric field is easily concentrated to the carbon nanotubes 705 constituting the bundles 704 on the printed pattern 710*a*, thereby more easily emitting electrons.

Oxygen gas plasma processing may be performed subsequent to the argon gas plasma processing. The oxygen gas plasma processing can uniformly expose the carbon nanotubes on the bundle surfaces. In this plasma processing, hydrogen gas may replace oxygen gas.

In dry etching using oxygen gas plasma, an etching target is etched considering the fact that the constituent element of the etching target and oxygen constitute a volatile compound. In dry etching using hydrogen gas plasma, the etching target is similarly etched.

When the bundles are exposed to an oxygen plasma or a hydrogen plasma, the carbon nanopolyhedorons as another carbon composition, rather than the carbon nanotubes constituting the bundles, selectively react with oxygen or hydrogen, gasifies as carbon dioxide or hydrocarbon, and etched away.

Accordingly, oxygen plasma processing subsequent to the Ar gas plasma processing can uniformly expose the tips of the carbon nanotubes on the surface of the exposed bundles.

By the oxygen plasma processing in addition to the argon gas plasma processing, a structure having many electron-emitting terminals can be manufactured, similar to the laser irradiation described above.

Also in this case, the electron-emitting source can be manufactured by a simple method in the order of pattern formation by, e.g., screen printing, calcination, and plasma processing.

The above electron-emitting source can be applied to, e.g., a vacuum fluorescent display apparatus.

In this case, the electron-emitting source is arranged inside a vacuum vessel constituting the vacuum fluorescent display apparatus. An anode having a phosphor layer is arranged in the vacuum vessel to face the electron-emitting source. Electrons emitted by the electron-emitting source are bombarded against the phosphor layer. The anode may be used as an extraction electrode, or an extraction electrode may be arranged between the phosphor layer and the electron-emitting source.

In the above embodiment, the bundle as an aggregate of carbon nanotubes is used, but the used bundle may be pulverized and used. Alternatively, the binder may be decomposed to prepare single carbon nanotubes.

As described above, the carbon nanotube may have a monolayer or multilayer structure, a structure in which the tip is closed by a five-membered ring, or a structure in which the tip is open without any five-membered ring. When a multilayer carbon nanotube whose tip is open is used, a larger number of electrons can be emitted.

Seventh Embodiment

An electron-emitting source according to the seventh embodiment of the present invention will be described.

The seventh embodiment is a modification of the cathode structure 406 in the image tube described in the third embodiment (FIG. 4A).

Figure 8:
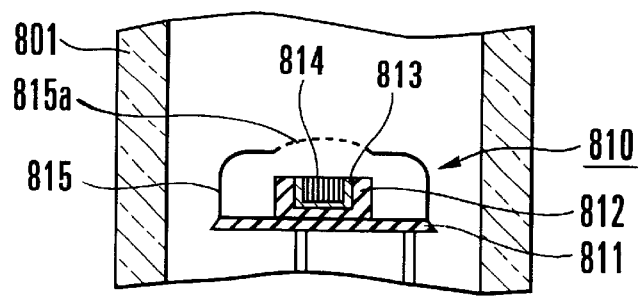
FIG. 8 is a sectional view showing the arrangement of an image tube using an electron-emitting source according to the seventh embodiment of the present invention.

In the seventh embodiment, a cathode structure 810 arranged in a glass valve 801 is constituted as shown in FIG. 8.

A cylinder 812 made of an insulating material is set on a ceramic substrate 811, and an electrode film 813 is formed on the inner bottom and side surfaces of the cylinder 812. Although not shown, the electrode film 813 is connected to a cathode lead.

The cylinder 812 having the electrode film 813 formed on the inner surface is filled with needle-like graphite columns 814 each made of an aggregate of carbon nanotubes and having a length of several μm to several mm, while their longitudinal directions substantially coincide with the direction to a phosphor screen (not shown). The cylinder 812 and the graphite columns 814 are covered with a housing 815 having a mesh portion (electron extraction electrode) 815a.

In the seventh embodiment, the cathode structure 810 is constituted by using, as an electron-emitting source, the cylinder 812 filled with the graphite columns 814 made of carbon nanotubes, fixing the cylinder 812 to the ceramic substrate 811, and mounting the housing 815 on the ceramic substrate 811 so as to cover them. The mesh portion 815a slightly spherically projects toward the phosphor screen (not shown). The mesh portion 815a may be flat. The housing 815 is formed by press-molding a stainless steel plate about 100 μm in thickness. The mesh portion 815a has a length of about 6 mm, a width of about 4 mm, and a height of about 1.25 mm. The mesh portion 815a is apart 0.5 to 1 mm from the top of the cylinder 812. The interval between them is preferably small as far as they are not in contact with each other.

The cathode structure 810 serving as an electron-emitting source in the seventh embodiment having this arrangement emits electrons as follows. The electric field is applied between the electrode film 813 and the housing 815. This concentrates a high electric field at the tips of the carbon nanotubes of the graphite columns 814 filled in the cylinder 812 in contact with the electrode film 813 to extract electrons and emit them from the mesh portion 815a. That is, in the seventh embodiment, the cathode structure 810 serves as a field emission type cold cathode electron source using, as an emitter, the carbon nanotubes of the graphite columns 814.

According to the seventh embodiment, the electron-emitting source is constituted by the cylinder filled with the graphite columns made of the carbon nanotubes, and is used as a field emission type cold cathode electron source.

According to the seventh embodiment, the electron-emitting source can be easily used without any deterioration by a gas produced in the vacuum vessel because of the absence of a fragile component such as a filament.

Since no filament heating power supply is required, the number of lead pins can be decreased, and the power consumption can be reduced.

In addition, since the carbon nanotubes are filled in the cylinder, electrons emitted by the carbon nanotubes filled in the cylinder pass through the opening of the cylinder. That is, the opening of the cylinder functions as a stop to narrow the range of the traveling directions of electrons emitted by the filled carbon nanotubes.

Consequently, a larger number of electrons emitted by the carbon nanotubes filled in the cylinder travel toward the phosphor screen (not shown) in the structure shown in FIG. 8. The stop effect can be enhanced by filling the carbon nanotubes in the cylinder 812 inward from the plane of the opening of the cylinder 812.

If the carbon nanotubes are not filled in the cylinder but formed in a flat electrode, the ratio of emitted electrons traveling toward the phosphor screen is as low as about 10%. However, if the carbon nanotubes (graphite columns) are filled in the cylinder as an electron-emitting source, the ratio of emitted electrons traveling toward the phosphor screen can be increased to 60% or more. As a result, even with the same voltage, a larger current can be flowed, and stronger light can be emitted.

In this embodiment, the cylinder is made of an insulating material, and the electrode film is formed on the inner surface. However, the structure is not limited to this, and the cylinder may be made of, e.g., a conductive material. This structure can eliminate the electrode film newly formed on the inner surface of the cylinder.

The seventh embodiment has exemplified the cathode structure used in the image tube, but is not limited to this. The present invention can also be applied to another vacuum fluorescent display apparatus having a light-emitting portion made of a phosphor in the vacuum vessel, and an electron-emitting source for causing this portion to emit light.

For example, the present invention can be similarly applied to an image tube which changes the emission color with an optical filter between the glass faceplate and the phosphor screen, and to an image tube which realizes a multicolor display with a plurality of phosphor screens in a single vacuum vessel.

Further, the present invention can also be applied to a flat tube which displays characters in desired shapes with a phosphor screen in a desired shape.

Eighth Embodiment

A method of manufacturing an electron-emitting source according to the eighth embodiment of the present invention will be described.

Figure 9A:
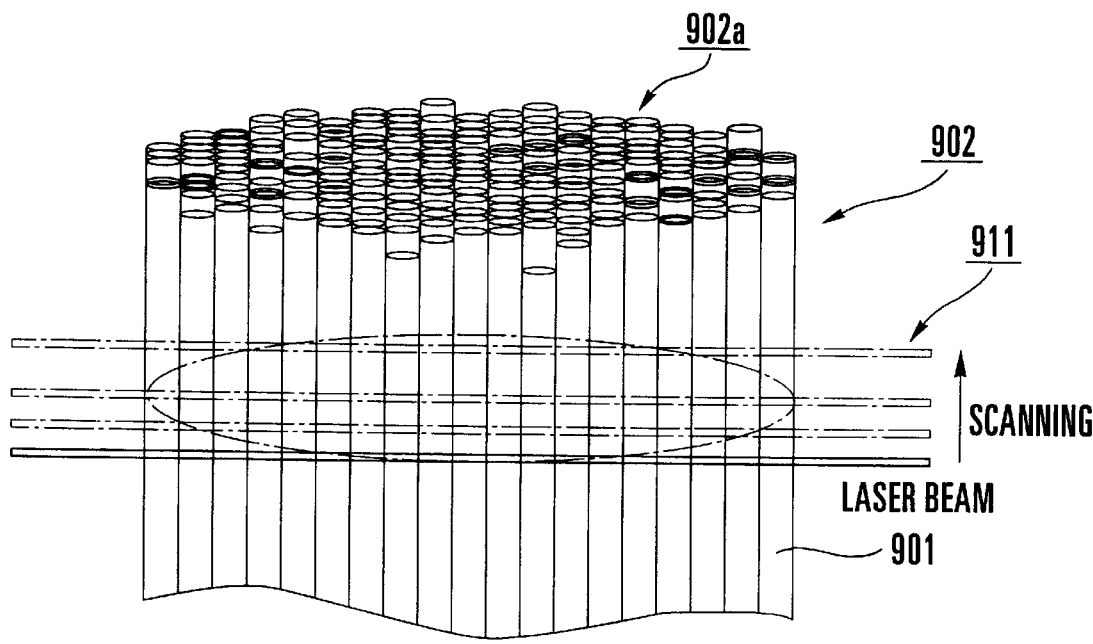
FIGS. 9A and 9B are views for explaining a method of manufacturing an electron-emitting source according to the eighth embodiment of the present invention.

As shown in FIG. 9A, a bundle 902 of graphite columns 901 is prepared. If the tips of the graphite columns 901 are not aligned, an electron-emitting surface 902a of the bundle 902 becomes uneven. The uneven electron-emitting surface 902a cannot uniformly emit electrons. However, it is difficult to bundle the graphite columns 901 with their tips being aligned, and form a flat electron-emitting surface.

As shown in FIG. 9A, the bundle 902 is perpendicularly irradiated and cut with a laser beam 911 from its side surface to form a surface cut by the laser, thereby obtaining the bundle 902 having a flat electron-emitting surface.

During cutting, the laser beam 911 perpendicular to the bundle 902 is scanned on the plane including the cut surface. For example, a $CO_2$ laser beam (continuous oscillation) about 100 μm in diameter is repeatedly scanned at an output of about 60 to 200 W and a scanning rate of about 10 mm/sec.

Scanning the laser beam perpendicular to an electron-emitting surface 903 of the bundle 902 can increase the electron emission efficiency of the electron-emitting surface. On the electron-emitting surface, the tips of the graphite columns 901 are exposed. As described above, the graphite column 901 is made of an aggregate of carbon nanotubes and carbon nanopolyhedorons. Electrons are easily emitted from the tips of the carbon nanotubes. For this reason, the tips of many carbon nanotubes are preferably exposed on the electron-emitting surface.

The carbon nanotube and a polycarbon powder such as a carbon nanopolyhedoron powder have different decomposition temperatures (combustion start temperatures). The carbon nanotube starts decomposition and combustion by heating to 700° C. or more in air. The polycarbon powder such as a carbon nanopolyhedoron powder starts decomposition and combustion by heating to 650° C. or more in air.

Accordingly, the carbon powder except for the carbon nanotube can be removed from the flat electron-emitting surface of the bundle 902 by laser irradiation at an irradiated portion temperature slightly higher than 650° C. Then, the ratio of the tips of the carbon nanotubes exposed on the electron-emitting surface increases, and the electron emission efficiency of the electron-emitting surface increases.

In irradiation of the laser beam for selective removal, a $CO_2$ laser beam (pulse oscillation) about 100 to 200 $\mu$m in diameter is scanned perpendicularly to the electron-emitting surface at an output of about 200 W and a main scanning rate of about 10 mm/sec. The subscanning interval of the laser beam is set within the range of 1/5 to 5 times the diameter of the 50- to 100-$\mu$m graphite column.

Figure 9B:
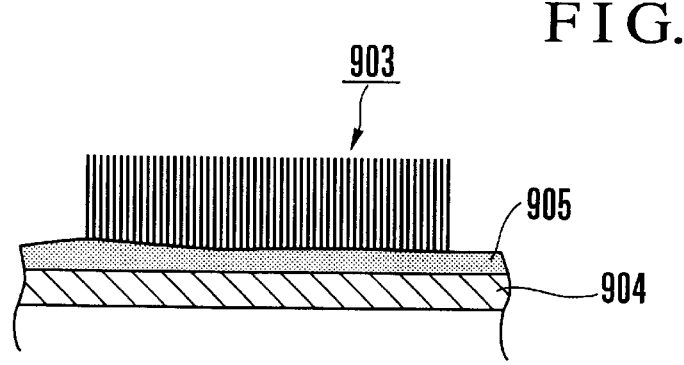

After the bundle 902 is formed in the above way, the bundle 902 is fixed to an electrode 904 with a conductive adhesive 905 to obtain an electron-emitting source in which the bundle 902 of the graphite columns with their tips aligned is formed on the electrode 904, as shown in FIG. 9B.

Note that the bundle 902 having a flat electron-emitting surface is formed and then fixed to the electrode 904, but the formation order is not limited to this. The bundle 902 having an uneven electron-emitting surface 902a may be fixed to the electrode 904, and then the electron-emitting surface may be made flat by the above-described processing.

In the eighth embodiment, the electron-emitting source is constituted by fixing the bundle of the graphite columns with their tips aligned to the electrode.

The graphite columns are bundled, and the distal end of the bundle is cut flat with a laser beam, thereby obtaining a flat electron-emitting surface. In the electron-emitting source of the eighth embodiment, the longitudinal directions of a plurality of carbon nanotubes coincide with a predetermined direction, while their tips are aligned. Further, a larger number of carbon nanotubes are exposed on the electron-emitting surface of the electron-emitting source of the eighth embodiment.

According to the eighth embodiment, the electron-emitting source is made of carbon nanotubes and used as a field emission type cold cathode electron source. Also in the eighth embodiment, the electron-emitting source can be easily used without any deterioration by a gas produced in the vacuum vessel because of the absence of a fragile component such as a filament.

Since no filament heating power supply is required, the number of lead pins can be decreased, and the power consumption can be reduced.

When the electron-emitting source of the eighth embodiment is used in the image tube described in the third embodiment, electrons can be emitted from the tips of almost all the carbon nanotubes constituting the electron-emitting source, and guided to the phosphor screen, resulting in a high luminance.

Ninth Embodiment

The above embodiments have exemplified the case in which the electron-emitting source is used in the electron gun of a picture tube or the image tube. However, the electron-emitting source of the present invention is not limited to them and may be used in an FED (Field Emission Display) as follows.

Figure 10A:
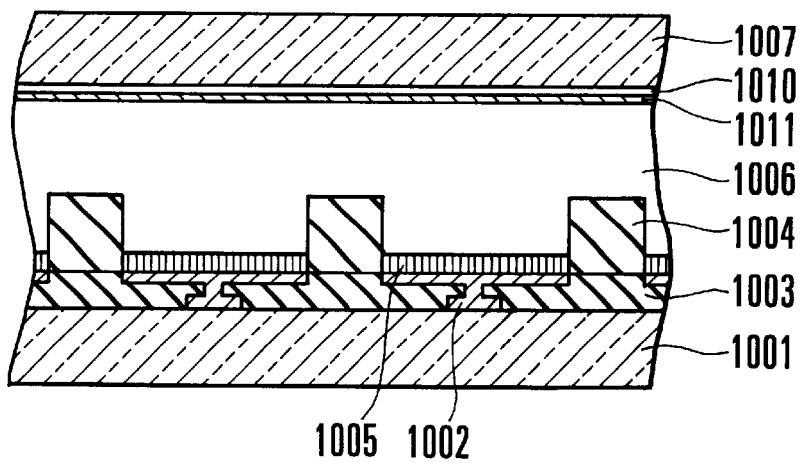
FIGS. 10A to 10C are sectional views showing the arrangement of an FED using an electron-emitting source according to the ninth embodiment of the present invention.
Figure 10B:
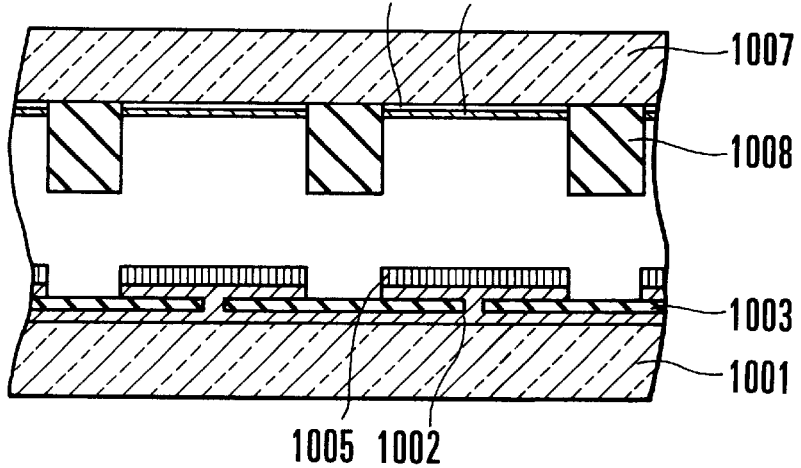
Figure 10C:
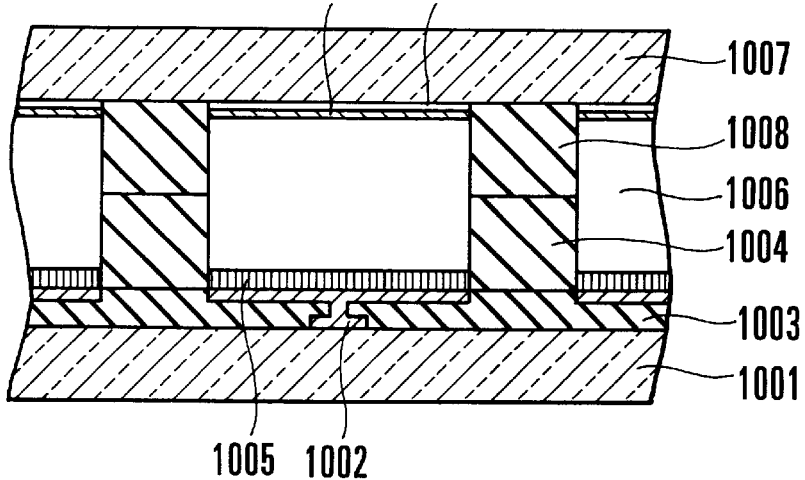
Figure 14A:
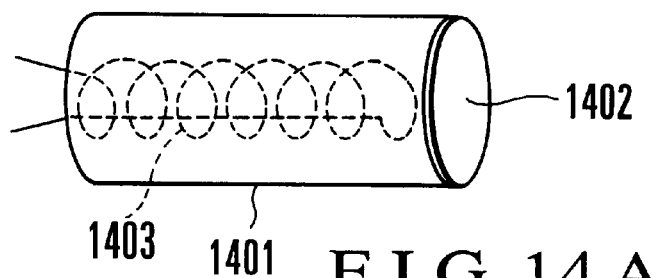
FIGS. 14A and 14B are views showing the arrangement of an electron gun using a conventional electron-emitting source.
Figure 14B:
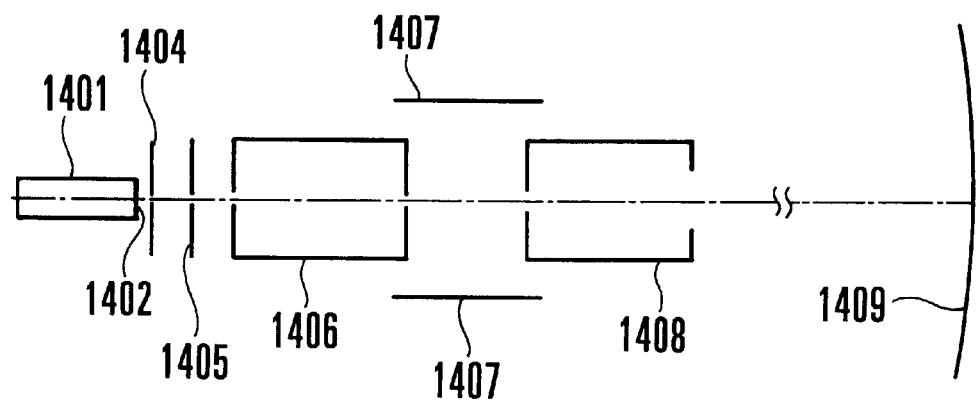
Figure 15:
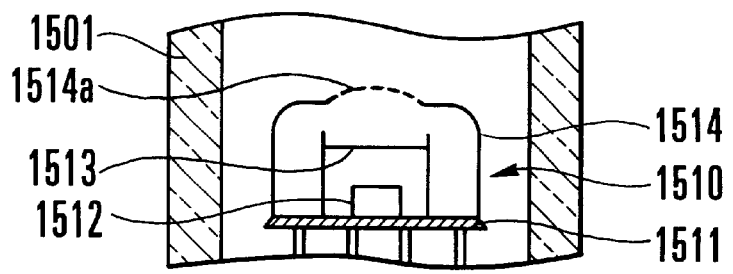
FIG. 15 is a sectional view showing the arrangement of an image tube using a conventional electron-emitting source.

The electron-emitting source of the present invention used in the FED will be described with reference to FIG. 10A to 11. FIGS. 10A to 10C and 11 show the basic arrangement of the FED in the ninth embodiment. In FIGS. 10A to 10C, FIG. 10A shows the section taken along the line A–A' in FIG. 11, FIG. 10B shows the section taken along the line B–B' in FIG. 11, and FIG. 10C shows the section taken along the line C–C' in FIG. 11.

The arrangement of the FED will be explained. An electrode interconnection layer 1002 is formed on a substrate 1001, and an insulating film 1003 is formed on the electrode interconnection layer 1002.

Substrate-side ribs 1004 are formed on the insulating film 1003 at a predetermined interval. Electron-emitting sources 1005 are formed at the portions of the insulating film 1003 between the substrate-side ribs 1004 at a predetermined interval. Each electron-emitting source 1005 is connected to any interconnection of the electrode interconnection layer 1002 via a through hole formed in the insulating film 1003.

A transparent front glass substrate 1007 faces the substrate 1001. The front glass substrate 1007 and the substrate 1001 are spaced apart by a predetermined distance by the substrate-side ribs 1004 and front ribs 1008 laid out perpendicularly to them. The gap between the front glass substrate 1007 and the substrate 1001 are kept in vacuum.

Light-emitting portions 1010 made of a phosphor are formed in stripes in the regions between the front ribs 1008 on the inner surface of the front glass substrate 1007. A metal-back film 1011 formed by depositing an aluminum film is formed on the surface of each light-emitting portion 1010.

As the phosphor constituting the light-emitting portion 1010, one used in a CRT or the like which emits light upon bombardment of electrons accelerated at a high energy of 4 to 10 keV is used.

As the phosphor constituting the light-emitting portion 1010, one used in a vacuum fluorescent display tube or the like which emits light upon bombardment of electrons accelerated at a low energy of 10 to 150 eV may be used. In this case, a transparent electrode is arranged between the light-emitting portion 1010 and the front glass substrate 1007 without forming the metal-back film 1011, and the voltage is applied from the transparent electrode to the light-emitting portion 1010.

In this arrangement, when a positive voltage is applied to the metal-back film 1011, and a negative voltage is applied to a predetermined interconnection of the electrode interconnection layer 1002, an electron-emitting source 1005 connected to this interconnection emits electrons. The emitted electrons reach a light-emitting portion 1010 facing the electron-emitting source 1005 to cause the light-emitting portion 1010 to emit light.

The FED is constituted by laying out a plurality of electron-emitting sources 1005 in a matrix so as to face a plurality of light-emitting portions 1010 laid out in stripes.

Note that an FED capable of color display can be realized by making given light-emitting portions 1010 of a phosphor for emitting red light, adjacent light-emitting portions 1010 of a phosphor for emitting blue light, and next adjacent light-emitting portions 1010 of a phosphor for emitting green light.

In the ninth embodiment, the electron-emitting source 1005 is made of carbon nanotubes, to be described below.

More specifically, the electron-emitting source 1005 is formed by fixing, to a predetermined region with, e.g., a conductive adhesive, needle-like graphite columns (needle-like structures) which are made of an aggregate of carbon nanotubes and have a length of several ten $\mu$m to several mm. The electron-emitting source 1005 may be formed by pattern formation by printing using a graphite column paste. The longitudinal direction of the graphite column preferably substantially coincides with the direction to the light-emitting portion 1010.

The graphite column is a needle-like structure made of an aggregate of carbon nanotubes oriented in almost the same direction.

In the electron-emitting source, electrons are emitted from the tips of the carbon nanotubes.

In the ninth embodiment, the electron-emitting source of the FED is made of the carbon nanotubes.

According to the ninth embodiment, the electron-emitting source can be formed by, e.g., printing at very low cost. For example, the electron-emitting source can be formed by applying the graphite column paste into a predetermined pattern on the substrate by screen printing.

For example, a paste is prepared by kneading needle-like graphite columns mainly containing carbon nanotubes and having a length of about ten μm, and a silver paste (conductive viscous solution) at a kneading ratio of 1:1. The silver paste is a fluid paste in which silver particles (metal particles) about 1 μm in diameter are dispersed together with glass particles about 1 μm in diameter in viscous vehicle obtained by dissolving a resin in a solvent. As the vehicle, a material excellent in decomposability and volatility which can be removed by heating in air at about 300 to 400° C. is used. As the glass particle, one which fuses at about 300 to 400° C. is used.

The paste is applied into a pattern on a predetermined portion of the substrate by, e.g., screen printing. Together with the substrate, the paste pattern formed on it is calcinated by heating at about 450° C. for a predetermined time. As a result, a printed pattern is formed such that the carbon nanotubes are covered with the silver particles bonded by binders obtained by fusing the glass particles.

The printed pattern made of the graphite columns can be easily formed in a desired shape by printing the paste. However, the graphite columns are rarely exposed on the surface of the printed pattern. In this state, the carbon nanotubes having electron-emitting terminals are hidden. Even upon application of the electric field to the printed pattern, electrons are hardly emitted. For this reason, the graphite columns are exposed on the surface of the printed pattern by the above-mentioned processing such as laser irradiation or plasma processing.

Since a plurality of carbon nanotubes exist in the electron-emitting source, as described above, many electron-emitting terminals exist in a unit area. Therefore, a larger number of electrons can be emitted, i.e., a larger current can be flowed through the phosphor screen, resulting in high luminance.

10th Embodiment

The 10th embodiment of the present invention will be described.

Another example of the FED using the electron-emitting source of the present invention will be explained with reference to FIG. 12. FIG. 12 shows the basic arrangement of the FED in the 10th embodiment of the present invention. FIG. 12 shows the section corresponding to the section taken along the line C–C' in FIG. 11.

The arrangement of the FED will be explained. An electrode interconnection layer 1202 is formed on a substrate 1201, and an insulating film 1203 is formed on the electrode interconnection layer 1202.

Substrate-side ribs 1204 are formed on the insulating film 1203 at a predetermined interval. Electron-emitting sources 1205 are formed at the portions of the insulating film 1203 between the substrate-side ribs 1204 at a predetermined interval. Also in the 10th embodiment, similar to the ninth embodiment, each electron-emitting source 1205 is made of carbon nanotubes. The electron-emitting source 1205 is connected to any interconnection of the electrode interconnection layer 1202 via a through hole formed in the insulating film 1203. In the 10th embodiment, as shown in FIG. 12, an electron extraction electrode 1206 is formed on each substrate-side rib 1204.

A transparent front glass substrate 1207 faces the substrate 1201. The front glass substrate 1207 and the substrate 1201 are spaced apart by a predetermined distance by the substrate-side ribs 1204 and front ribs 1208 laid out perpendicularly to them. The gap between the front glass substrate 1207 and the substrate 1201 are kept in vacuum.

Similar to the ninth embodiment, light-emitting portions 1210 made of a phosphor are formed in stripes in the regions between the front ribs 1208 on the inner surface of the front glass substrate 1207. A metal-back film 1211 formed by depositing an aluminum film is formed on the surface of each light-emitting portion 1210.

In this arrangement, when a positive voltage is applied to the metal-back film 1211, a positive voltage is applied to the electron extraction electrode 1206, and a negative voltage is applied to a predetermined interconnection of the electrode interconnection layer 1202, an electron-emitting source 1205 connected to this interconnection emits electrons. The emitted electrons reach a light-emitting portion 1210 facing the electron-emitting source 1205 to cause the light-emitting portion 1210 to emit light. The FED is constituted by laying out a plurality of electron-emitting sources 1205 in a matrix so as to face a plurality of light-emitting portions 1210 laid out in stripes.

Also in the 10th embodiment, the electron-emitting source of the FED is made of the carbon nanotubes. The electron-emitting source can be formed by, e.g., printing at very low cost. For example, the electron-emitting source can be formed by applying the graphite column paste into a predetermined pattern on the substrate by screen printing.

The electron-emitting source is made of a plurality of graphite columns, as described above. That is, since a plurality of carbon nanotubes exist in the electron-emitting source, many electron-emitting terminals exist in a unit area. Accordingly, also in the FED of the 10th embodiment, a larger number of electrons can be emitted from the electron-emitting source, i.e., a larger current can be flowed through the phosphor screen, resulting in high luminance.

11th Embodiment

Although the ninth and 10th embodiments employ the substrate-side and front ribs, the present invention is not limited to this, and either one of the ribs suffices to be arranged.

The case in which the rib is formed on only one side will be described as the 11th embodiment of the present invention.

More specifically, as shown in FIG. 13, an electrode interconnection layer 1302 is formed on a substrate 1301, and an insulating film 1303 is formed on the electrode interconnection layer 1302. Ribs 1304 are set on the insulating film 1303 at a predetermined interval. Electron-emitting sources 1305 are formed at the portions of the insulating film 1303 between the ribs 1304 at a predetermined interval. Each electron-emitting source 1305 is connected to any interconnection of the electrode interconnection layer 1302 via a through hole formed in the insulating film 1303. The electron-emitting source 1305 is made of carbon nanotubes.

A transparent front glass substrate 1307 faces the substrate 1301. In the 11th embodiment, the front glass substrate 1307 and the substrate 1301 are spaced apart by a predetermined distance by the ribs 1304. The gap between the front glass substrate 1307 and the substrate 1301 are kept in vacuum.

Light-emitting portions 1310 made of a phosphor are formed in stripes in the regions between the front ribs 1308 on the inner surface of the front glass substrate 1307. A metal-back film 1311 formed by depositing an aluminum film is formed on the surface of each light-emitting portion 1310.

As the phosphor constituting the light-emitting portion 1310, one used in a CRT or the like which emits light upon bombardment of electrons accelerated at a high energy of 4 to 10 keV is used.

In the 11th embodiment, the light-emitting portion 1310 is formed in the region between the ribs 1304. However, the present invention is not limited to this, and the upper portion of the rib may be in contact with the upper portion of the formed light-emitting portion.

As has been described above, the electron-emitting source of the present invention is made of carbon nanotubes formed from a columnar graphite layer. The carbon nanotubes may be formed from a multilayer graphite column whose tip is open. In general, a plurality of carbon nanotubes aggregate to a needle-like structure.

With this structure, electrons can be emitted from the tips of the carbon nanotubes upon application of the voltage to the carbon nanotubes in vacuum. The electron-emitting source using the carbon nanotubes is a resistant structure. This allows to apply a higher voltage, and thus the electron-emitting source can emit a larger number of electrons. Since the carbon nanotube is a rigid structure which is hardly oxidized, the electron-emitting source can be manufactured more easily than a conventional electron-emitting substance made of a ternary oxidize.

In the electron-emitting source of the present invention, the carbon nanotubes are fixed to the substrate with a conductive adhesive.

With this structure, electrons can be emitted from the tips of the carbon nanotubes upon application of the voltage to the carbon nanotubes via the substrate in vacuum. The electron-emitting source using the carbon nanotubes is a resistant structure. This allows to flow a larger current, and thus the electron-emitting source can emit a larger number of electrons. Since the carbon nanotube is a rigid structure which is hardly oxidized, the electron-emitting source can be manufactured more easily than a conventional electron-emitting substance made of a ternary oxidize.

In the electron-emitting source of the present invention, the substrate is recessed, and the recess is filled with a plurality of carbon nanotubes.

With this structure, electrons can be emitted from the tips of the carbon nanotubes upon application of the voltage to the carbon nanotubes via the substrate in vacuum. The electron-emitting source using the carbon nanotubes is a resistant structure. This allows to flow a larger current, and thus the electron-emitting source can emit a larger number of electrons. Since the electron-emitting source has a plurality of carbon nanotubes, it has a plurality of electron-emitting terminals and thus can emit many electrons. Since the carbon nanotube is a rigid structure which is hardly oxidized, the electron-emitting source can be manufactured more easily than a conventional electron-emitting substance made of a ternary oxidize.

In a method of manufacturing the electron-emitting source of the present invention, a paste obtained by dispersing, in a conductive viscous solution, a plurality of needle-like structures each made of an aggregate of carbon nanotubes is prepared. A pattern of this paste is formed on the substrate. Portions except for the needle-like structures are removed from the surface of the pattern by a predetermined amount to at least partially expose the needle-like structures, thereby manufacturing an electron-emitting source in which the carbon nanotubes are fixed to the substrate. The portions except for the needle-like structures are removed by laser irradiation or plasma processing.

With this processing, the needle-like structures can be exposed. By laser irradiation, the portions of the needle-like structures except for the carbon nanotubes can be removed to expose the electron-emitting tips. This allows the electron-emitting source to flow a large current and emit a larger number of electrons.

In a method of manufacturing the electron-emitting source of the present invention, a paste obtained by dispersing, in a conductive viscous solution, a plurality of needle-like structures each made of an aggregate of carbon nanotubes is prepared. A pattern of this paste is formed on the substrate. Portions except for the needle-like structures are removed from the surface of the pattern by a predetermined amount to at least partially expose the needle-like structures. In addition, portions except for the carbon nanotubes are removed from the tips of the needle-like structures by a predetermined amount to expose the tips of the carbon nanotubes, thereby manufacturing an electron-emitting source in which the carbon nanotubes are fixed to the substrate. The portions except for the needle-like structures are removed by exposing the pattern to an oxygen or hydrogen gas plasma.

With this processing, the electron-emitting tips can be exposed. This allows the electron-emitting source to flow a large current and emit a larger number of electrons.

What is claimed is:

1. An electron-emitting source comprising:
   a carbon nanotube formed from a columnar graphite layer formed from a multilayer graphite column whose tip is open.

2. A source according to claim 1, further comprising a needle-like structure made of an aggregate of carbon nanotubes.

3. A source according to claim 2, further comprising a plurality of needle-like structures while longitudinal directions coincide with the same direction.

4. An electron-emitting source comprising:
   a conductive substrate (406a, 507, 601, 701, 904);
   a carbon nanotube (132) formed from a columnar graphite layer formed from a multilayer graphite column whose tip is open, the longitudinal direction of said carbon nanotube coinciding with a line of the plane of said conductive substrate (406a, 507, 601, 701, 904): and
   a conductive adhesive (422, 508, 602, 710a, 905) prepared between said carbon nanotube and said substrate so that said carbon nanotube is adhered to the substrate (406a, 507, 601, 701, 904).

5. A source according to claim 4, wherein the carbon nanotube is fixed to the substrate with the conductive adhesive while a tip of the carbon nanotube is exposed.

6. A source according to claim 5, wherein a plurality of recesses are formed in a surface of the substrate and filled with the plurality of carbon nanotubes.

7. An electron-emitting source according to claim 4, said carbon nanotube has a flat electron emitting surface.

8. An electron-emitting source according to claim 4, said carbon nanotube has an uneven electron emitting surface.

9. An electron-emitting source comprising: a central portion made of a plurality of needle-like structures whose longitudinal directions coincide with the same direction and each of which is an aggregate of carbon nanotubes whose longitudinal directions coincide with the same direction and which are formed from a columnar graphite layer; and polycrystalline graphite covering the central portion.

10. An electron-emitting source comprising: an aggregate obtained by bundling a plurality of needle-like structures each as an aggregate of carbon nanotubes whose longitudinal directions coincide with the same direction and which are formed from a columnar graphite layer formed from a multilayer graphite column whose tip is open, while tips of the needle-like structures are aligned.

11. An electron-emitting source comprising:

a carbon nanotube (132) formed from a columnar graphite layer formed from a multilayer graphite column whose tip is open;

a cathode electrode on which said carbon nanotubes is fixed to the cathode electrode with a conductive adhesive; and an anode electrode spaced from said cathode electrode.

* * * * *